June 17, 1952  M. B. WENSCOTT ET AL  2,600,714
GASKET FOR PRESSURE COOKERS
Filed May 18, 1946
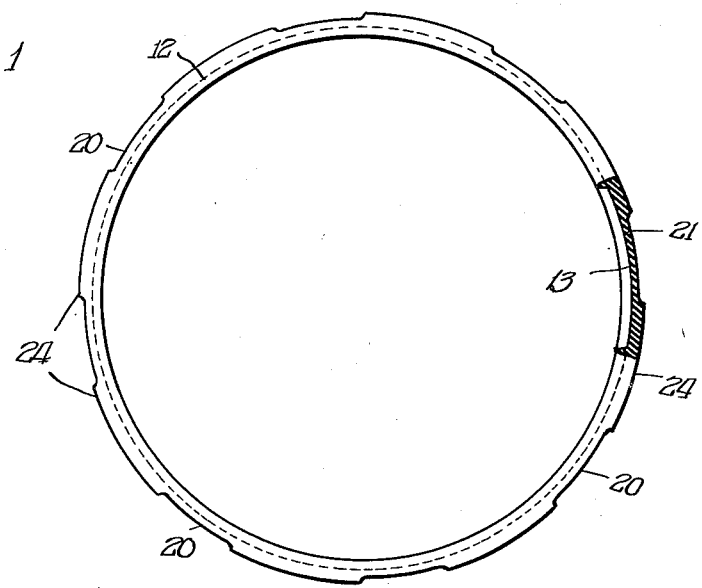
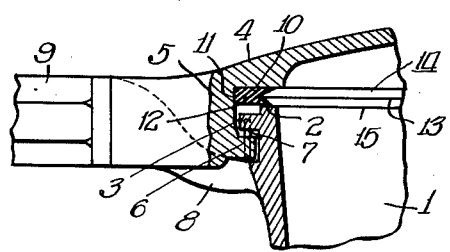
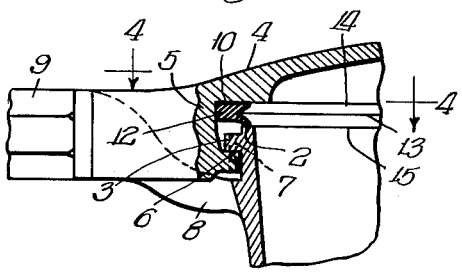
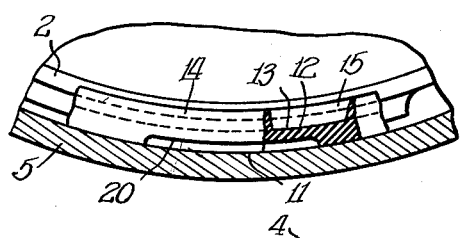
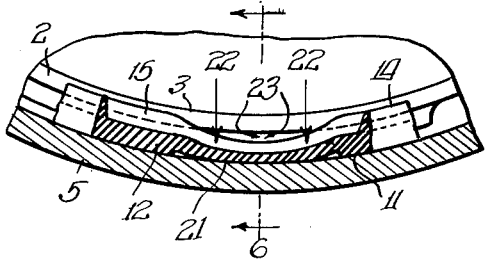
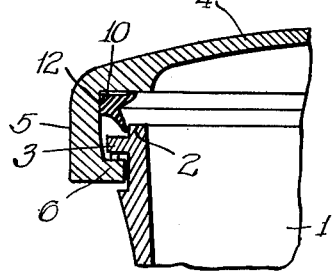
INVENTORS.
Max B. Wenscott,
BY Clifton O. Strom,
George H. Simmons
Atty.

Patented June 17, 1952

2,600,714

UNITED STATES PATENT OFFICE 2,600,714

GASKET FOR PRESSURE COOKERS

Max B. Wenscott and Clifton O. Strom, Racine, Wis., assignors, by mesne assignments, to Speed-Meal Corporation, Racine, Wis., a corporation of Delaware Application May 18, 1946, Serial No. 670,783

8 Claims. (Cl. 220—46)

1

This invention relates to gaskets for pressure vessels and has for its principal object the provision of a new and improved device of this kind.

It is a main object of the invention to provide a gasket which is operated by pressure in a vessel to seal the vessel and make it pressuretight.

Another object of the invention is to provide a gasket for pressure vessels which will seal the vessel under predetermined normal pressure and will release itself to relieve the pressure in the vessel when that pressure exceeds said predetermined value.

Another object of the invention is to provide a gasket for a pressure vessel that can be removed readily from the vessel for cleaning and sterilization of the vessel and gasket.

Another object of the invention is to provide a gasket that can be manufactured at low cost without sacrificing quality, uniformity and durability.

Further objects of the invention not specifically mentioned here will be apparent from the detailed description and claims which follow, reference being had to the accompanying drawings in which a preferred embodiment of the invention is shown by way of example and in which:

Figure 1 is a plan view of the gasket, partly in section;

Figure 2 is a fragmentary cross-sectional view of a pressure vessel with the gasket applied thereto in initial no-pressure position;

Figure 3 is a view similar to Figure 2 showing the gasket under normal operating pressure;

Figure 4 is a fragmentary cross-sectional view taken substantially along the line 4—4 of Figure 3 looking in the direction of the arrows and drawn to an enlarged scale and showing the gasket under normal pressure;

Figure 5 is a view similar to Figure 4 and showing the gasket under excess pressure; and Figure 6 is a fragmentary cross-sectional view taken substantially along the line 6—6 of Figure 5 looking in the direction of the arrows and drawn to an enlarged scale.

Pressure vessels such as domestic pressure cookers frequently consist of a main cooker body and a cover therefor that is secured to the body by first moving the cover vertically and then rotating it to engage lugs on the cover with the ribs on the cooker body to form a so-called bayonet joint. The cooker body contains a flat sealing surface, and the cover contains a similar surface, and these two surfaces are substantially parallel when the cover is locked in place on the cooker. A gasket is interposed between these two

2 sealing surfaces and serves to seal the vessel pressuretight.

In the prior art of which we are aware numerous gaskets have depended upon compression between the cover and the cooker body to form the pressure seal. Such an arrangement requires the exerting of considerable pressure between the cooker and cover in order to draw the seal tight, with the result that the life of the gasket has been short. Other prior art devices of which we are aware have employed so-called self-sealing gaskets which employ the pressure within the vessel in the formation of the seal of the vessel. The present invention provides a new and improved self-sealing type of gasket.

Domestic-type pressure cookers are provided with a safety valve that is arranged to vent the vessel to permit excess pressures to escape therefrom. Most of these safety valves are adjustable so that the pressure in the vessel can be maintained at several different values, usually about 5, 10 and 15 pounds. The orifice through which excess pressure escapes through the safety valve is rather small and may readily become clogged with particles of food from within the cooker, thereby creating a dangerous condition if the safety valve is clogged and heat is maintained on the cooker as high pressures will be developed in it.

Prior art cookers of which we are aware have also been provided with a safety plug designed to release at a pressure somewhat higher than the normal operating pressure of the cooker but still low enough to be considered safe. These prior art devices, which usually consist of a rubber or synthetic rubber diaphragm-type plug, have not been altogether satisfactory for several reasons, most important of which is that the pressures required to cause the plug to release have been far from uniform and most generally have been too high for real safety. Furthermore, the orifice through which the pressure escapes when this plug has released is rather small, with the result that cooking juices and oftentimes solids in the cooker have been blown out of it to damage the walls and ceiling of the room and oftentimes scalding the housewife.

The present invention remedies this defect in prior art cookers by providing in the self-sealing gasket an arrangement for permitting the gasket to release and break the seal of the cooker when the pressure therein exceeds a predetermined value. In cookers in which the normal operating pressure is 15 pounds, the gasket may be designed to release at approximately 25 pounds, which is considerably lower than safety release plugs employed heretofore. When the gasket breaks the seal of the vessel, the pressure therein escapes at a number of different points and is deflected downwardly by a flange on the cover which lies outside of the main body of the cooker. Any juices or particles of food blown out of the cooker will be deflected downwardly onto the stove and can be removed therefrom more readily than from the walls and ceiling of the kitchen. Since the force of the pressure is downward, there is less danger of the housewife being burned or scalded.

Referring now to the drawings in more detail, particularly Figures 2 to 6 inclusive, it will be seen that the cooker has a main body 1 preferably generally cylindrical in shape and provided with a flat sealing surface 2 located at its upper edge. Projecting outwardly from the main body of the cooker is a series of ribs 3 which are uniformly spaced around the periphery. The cover 4 has a downwardly depending flange 5 that contains inwardly projecting lugs 6 that are designed to pass between adjacent ones of the ribs 3 as the cover is being placed on the cooker and then to move underneath the ribs as the cover is rotated. A suitable pin 7 is engaged by one of the lugs 6 to limit this rotation. The particular arrangement for securing the cover on the cooker body is not of the essence of the present invention and the bayonet connection described is by way of example only. As shown in the drawing the cooker is provided with a handle 8 and the cover with a handle 9. The particular shape and location of these handles is not of the essence of the present invention.

Located within the cover 4 is a sealing ring or flat surface 10, and a cylindrical flange wall 11 projects downwardly therefrom on a circle deposed just outside of the outermost portion of the cooker body 1. When the cover is in place on the cooker sealing surface 10 will be substantially parallel to the sealing surface 2 on the cooker body. The gasket 12 of the present invention, best seen in Figure 1, is interposed between these two surfaces with its outermost portion engaging the flange 11. Preferably the thickness of the gasket and the spacing of the ribs and lugs is such that before pressure is built up in the vessel there is a substantial clearance between the bottom surfaces of the ribs 3 and the top surfaces of the lugs 6, so that the initial seal of the vessel is formed solely by the weight of the cover acting to compress the gasket.

As will be seen in the drawings, the inner face of the gasket contains a V slot 13 that forms two sealing lips 14 and 15 which are deposed so that pressure within the cooker will force the lip 14 upwardly into sealing engagement with the sealing surface 10 on the cover and will force the lip 15 downwardly into sealing engagement with the sealing surface 2 on the cooker body. This pressure acting upwardly on the inner side of the top of the cover raises the cover and brings the upper surfaces of the lugs 6 into tight engagement with the lower surfaces of the ribs 3. The pressure thus generated in the cooker is built up to normal operating pressure, usually 15 pounds per square inch, and is maintained at that value by the safety valve in the usual manner.

As will be seen best in Figure 1, the gasket 12 contains a plurality of indentations 20 in its outer surface which indentations space the adjacent portion of the gasket away from the flange face 11 depending below the sealing surface 10 on the cover. The thickness of the wall section 21 between the bottom of the V slot 13 and the bottom of the notch 20 is carefully controlled for a purpose which will presently appear. As will be seen in Figure 4, when the cooker is operating under normal pressure, the friction between the sealing lip 14 and the sealing surface 10 and the friction between the sealing lip 15 and the surface 2 combine with the natural strength of the wall section 21 to hold that section in its normal position to maintain the vessel sealed. In normal operation the gasket remains in this position.

In the event that the safety valve of the cooker (not shown) fails to operate for any reason and the pressure in the vessel exceeds normal value, the strength of the wall section 21 will not be sufficient to maintain the gasket in the position in which it is shown in Figure 4 but rather the gasket will be deformed by this pressure acting outwardly on it as indicated by the arrows 22, Figure 5, to move the wall section 21 outwardly against the face 11 of the flange 5. This movement will move the sealing lip 15 off of the sealing surface 2 to permit the pressure to escape downwardly and outwardly from the vessel as indicated by the arrows 23 in Figures 5 and 6. This pressure and any liquids or solids that are thus blown out of the cooker will strike against the flange surface 11 and be deflected downwardly alongside the outer face of the cooker. Pressure is thus relieved in a safe manner.

As shown in Figure 1, the gasket 12 contains 8 indentations 20 in its outer periphery, which indentations are separated by 8 sections 24 which are somewhat longer than the indentations. This arrangement may be varied within the teachings of the invention. The thickness of the wall section 21 which separates the bottom of the recess 20 from the bottom of the V slot in the gasket, and the length of this wall section 21 determine the amount of pressure required to break the seal. With the material in the gasket of fixed elasticity the longer the wall section 21 the lower the pressure required to force these portions of the gasket outwardly against the flange. With the length of the section fixed, the thinner the thickness the lower the pressure required. By proper design of the gasket with these factors in mind the seal can be broken at any desired pressure value.

Since the gasket 12 is exposed to the inner surfaces of the cooker it will come in contact with grease when the cooker is being used to cook meats and the like, and therefore it is necessary that the gasket be composed of a flexible material that will not be deteriorated by cooking fats and oils. We have found that synthetic rubber known under the trade name of neoprene is satisfactory for this purpose and is capable of withstanding the temperatures and greases with which the gasket must be used. We have found that gaskets molded from this material in the proportions shown and maintained within a durometer hardness reading of from 50 to 55 will be uniform in their operation and capable of relieving pressure within the cooker at values varying between 24 and 26 pounds.

Pressures of about 25 pounds are far below the maximum pressure that the cooker and cover are capable of withstanding and are far enough above the normal working pressures to preclude blowing the gasket unnecessarily. The release of a pressure of 25 pounds is sufficiently alarming to attract the attention of the housewife but not so alarming as to scare her unduly. When the gasket has released the pressure the cover must be removed and the gasket reseated on the sealing surfaces before pressure can again be built up in the cooker. While the cover is removed from the cooker, the safety valve can be cleared so that the cooker will again function in a normal manner.

The outside diameter of the wall portions 24 of the gasket is maintained at such value that it will fit snugly against the flange face 11 and the gasket will be maintained in place in the cover without the use of any special fastening means. If the cover is handled roughly the gasket may slip down onto the upper surfaces of lugs 6, but it will be pushed back into place as the cover is placed on the cooker. Since the gasket is not fastened in the cover it may be removed easily for cleaning and sterilization of the cover and gasket.

The gasket of the present invention possesses many advantages over gaskets of the prior art. Since the gasket is self-sealing it is not subjected to enormous pressures as the cover is being rotated into locking position on the cooker body and consequently is not subjected to the wear and tear to which a pressure sealing gasket is subjected. Tight sealing of the cooker is achieved by the pressure in the cooker itself. Excess pressure generated upon failure of the normal safety valve to function properly is relieved by the release of the gasket before that pressure has built up to the danger point. Juices and food particles blown out of the cooker are directed downwardly in a safe direction. The gasket and cooker can be thoroughly cleaned and sterilized as often as necessary and the gasket is capable of rendering long satisfactory service.

While we have chosen to show our invention by illustrating and describing a preferred embodiment of it, we have done so by way of example only, as there are many modifications and adaptations which can be made by one skilled in the art within the teachings of the invention.

Having thus complied with the statutes and shown and described a preferred embodiment of our invention, what we consider new and desire to have protected by Letters patent is pointed out in the appended claims.

What is claimed is:

1. The combination with a pressure cooker comprising a body member having a sealing seat on its upper edge, a removable cover member for said body member having a depending rim adapted to receive and engage over the upper edge of the body member, said cover member having an annular sealing seat facing the seat on the body member, and interlocking means carried by the members and interengageable when the cover is turned to a certain position; of a sealing gasket carried by one of said members having flexible sealing lips movable by internal pressure into sealing contacts with said seats, said gasket having at least one weakened deformable area subject to deformation radially outwardly by internal pressure in the cooker when said pressure reaches a predetermined value above normal cooking pressure thereby to move one of said flexible sealing lips off of its seat and release said pressure.

2. The combination with a pressure cooker, having a cooker body, a cover, a flange depending from said cover outside of said body, means for locking the cover on the body, a sealing surface on said cover adjacent said flange, and a sealing surface on said body; of a flexible gasket interposed between sealing surfaces and expansible laterally into sealing engagement therewith by pressure in the cooker to seal the cooker, said gasket having interrupted engagement with said flange to prevent normal working pressure within the cooker from moving the gasket outwardly, said interrupted areas of non-engagement of the gasket and flange permitting an excess pressure in the cooker to move sections of the gasket radially outwardly into engagement with the flange and hence off of the sealing surface on said body thereby to permit said excess pressure to escape from the cooker.

3. The combination with a pressure cooker having a body and cover removably secured together, in which position a seating surface on the cover is disposed in juxtaposition to a seating surface on the body, and in which position a flange on the cover extends downwardly from the seating surface on the body and is disposed radially outwardly therefrom; of a gasket for sealing the body and cover, comprising an annulus composed of a rubberlike material of rectangular cross section disposed against said flange and projecting radially inwardly therefrom, tapered lips projecting radially inwardly from said annulus and forming between them a V slot exposed to pressure within the cooker, which forces said lips axially of the annulus into sealing engagement with said seating surfaces, said gasket having at least one recess in its outer edge which leaves a section of the gasket free to be moved radially outwardly by excessive pressure in the cooker thereby to move said lips off of at least one of said seating surfaces to permit escape of the pressure from the cooker.

4. The combination with a pressure cooker having a body and cover removably secured together, in which position a seating surface on the cover is disposed in juxtaposition to a seating surface on the body, and in which position a flange on the cover extends downwardly from the seating surface on the body and is disposed radially outwardly therefrom; of a gasket for sealing the body and cover, comprising an annulus composed of a rubberlike material of rectangular cross section disposed against said flange and projecting radially inwardly therefrom, tapered lips projecting radially inwardly from said annulus and forming between them a V slot exposed to pressure within the cooker, which forces said lips axially of the annulus into sealing engagement with said seating surfaces, said gasket having recesses in its outer edge which leave sections of the gasket free to be moved radially outwardly by excessive pressure in the cooker thereby to move said lips off of at least one of said seating surfaces to permit escape of the pressure from the cooker.

5. The combination with a pressure cooker having a body and cover removably secured together, in which position a seating surface on the cover is disposed in juxtaposition to a seating surface on the body, and in which position a flange on the cover extends downwardly from the seating surface on the body and is disposed radially outwardly therefrom; of a gasket for sealing the body and cover, comprising an annulus composed of a rubberlike material of rectangular cross section disposed against said flange and projecting radially inwardly therefrom, tapered lips projecting radially inwardly from said annulus and forming between them a V slot exposed to pressure within the cooker, which forces said lips axially of the annulus into sealing engagement with said seating surfaces, said gasket having at least one recess in its outer edge which leaves a section of the gasket free to be moved radially outwardly by a pressure of from twenty-five to thirty pounds in the cooker thereby to move said lips off at least one of said seating surfaces to permit escape of the pressure from the cooker.

6. The combination with a pressure cooker having a body and cover removably secured together, in which position a seating surface on the cover is disposed in juxtaposition to a seating surface on the body, and in which position a flange on the cover extends downwardly from the seating surface on the body and is disposed radially outwardly therefrom; of a gasket for sealing the body and cover, comprising an annulus composed of a rubberlike material of rectangular cross section disposed against said flange and projecting radially inwardly therefrom, tapered lips projecting radially inwardly from said annulus and forming between them a V slot exposed to pressure within the cooker, which forces said lips axially of the annulus into sealing engagement with said seating surfaces, said gasket having at least one recess in its outer edge which leaves a section of the gasket free to be moved in the direction of application of pressure to the gasket by a pressure of from twenty-five to thirty pounds in the cooker thereby to move at least one of said seating surfaces to permit escape of the pressure from the cooker.

7. The combination with a pressure cooker having a body and cover removably secured together, in which position a seating surface on the cover is disposed in juxtaposition to a seating surface on the body, and in which position a flange on the cover extends downwardly from the seating surface on the body and is disposed radially outwardly therefrom; of a gasket for sealing the body and cover, comprising an annulus composed of a rubberlike material of rectangular cross section disposed against said flange and projecting radially inwardly therefrom, tapered lips projecting radially inwardly from said annulus and forming between them a V slot exposed to pressure within the cooker, which forces said lips axially of the annulus into sealing engagement with said seating surfaces, said gasket having at least one recess in its outer edge of sufficient length to leave the adjacent sections of the gasket free to be moved radially outwardly by a pressure of from twenty-five to thirty pounds in the cooker and of sufficient depth to enable said movement to move said lips off at least one of said seating surfaces to permit escape of the pressure from the cooker.

8. A gasket for sealing pressure vessels comprising: an annulus of rubberlike material having spaced apart substantially parallel upper and lower planar faces; a pair of sloping walls converging from the inner edges of said faces towards a plane midway therebetween and forming between them a V groove in the inner edge of the annulus; and a plurality of integral bosses projecting outwardly from the outer cylindrical surface of the annulus, extending between said upper and lower planar faces and having outer edges which are sections of a cylinder that is concentric with said outer cylindrical surface of the annulus, said bosses being spaced apart a distance slightly less than their length circumferentially of the annulus.

MAX B. WENSCOTT.
CLIFTON O. STROM.

REFERENCES CITED

The following references are of record in the file of this patent:

UNITED STATES PATENTS

| Number | Name | Date |
| --- | --- | --- |
| 1,157,574 | Mueller | Oct. 19, 1915 |
| 1,823,233 | Bell | Sept. 15, 1931 |
| 2,178,140 | Fetzer | Oct. 31, 1939 |
| 2,399,115 | Hansen et al. | Apr. 23, 1946 |

FOREIGN PATENTS

| Number | Country | Date |
| --- | --- | --- |
| 733,878 | France | July 19, 1932 |